(12) United States Patent
Moler

(10) Patent No.: US 8,533,402 B1
(45) Date of Patent: Sep. 10, 2013

(54) CACHING AND DECACHING DISTRIBUTED ARRAYS ACROSS CACHES IN A PARALLEL PROCESSING ENVIRONMENT

(75) Inventor: Cleve Moler, West Newbury, MA (US)

(73) Assignee: The MathWorks, Inc., Natick, MA (US)

(*) Notice: Subject to any disclaimer, the term of this patent is extended or adjusted under 35 U.S.C. 154(b) by 1177 days.

(21) Appl. No.: 11/165,467

(22) Filed: Jun. 22, 2005

Related U.S. Application Data

(63) Continuation-in-part of application No. 10/940,152, filed on Sep. 13, 2004, now Pat. No. 8,397,224.

(51) Int. Cl.
*G06F 15/167* (2006.01)
(52) U.S. Cl.
USPC ............ 711/147; 711/120; 711/141; 711/165; 709/202; 709/212; 709/213
(58) Field of Classification Search
USPC ................. 711/112, 118–121, 124, 141, 147, 711/165; 709/202, 212–213
See application file for complete search history.

(56) References Cited

U.S. PATENT DOCUMENTS

| | | | |
|---|---|---|---|
| 6,343,347 B1 * | 1/2002 | Arimilli et al. ............... | 711/143 |
| 6,622,301 B1 | 9/2003 | Hirooka et al. | |
| 6,636,950 B1 * | 10/2003 | Mithal et al. .................. | 711/147 |
| 6,658,533 B1 * | 12/2003 | Bogin et al. ................... | 711/135 |
| 2004/0261058 A1 | 12/2004 | Kundert | |

OTHER PUBLICATIONS

Handy, The Cache Memory Book, 1998, Academic Press, Second Edition, pp. 64-71,138-143.*

Luo et al., A Scalable Parallel Strassen's Matrix Multiplication Algorithm for Distributed-Memory Computers, 1995, ACM, Symposium on Applied Computing, pp. 221-226*
Handy, The Cache Memory Book, 1998, Academic Press, 2nd Ed, pp. 144-151.*
Attiya et al., Sharing Memory Robustly in Message-Passing Systems, 1995, Journal of the Association for Computing Machinery vol. 42, pp. 124-142.*
Husbands, Parry Jones Reginald, "Interactive Supercomputing," pp. 1-96 (1999).
Chen, Ying et al, "MATLAB*G: A Grid-Based Parallel MATLAB," Retrieved from the Internet: http://www.ntu-cg.ntu.edu.sg/GRID_competition/report/grid-9.pdf (2006_.

(Continued)

*Primary Examiner* — Ryan Bertram
(74) *Attorney, Agent, or Firm* — Nelson Mullins Riley & Scarborough LLP

(57) ABSTRACT

The present invention provides for automatically caching via extensions indices in a technical computing environment one or more portions of a distributed array assigned to other technical computing environments for processing. A set of executable instruction, such as a technical computing program or script, may be executed to run in parallel in multiple technical computing environments. As the technical computing program runs on each technical computing environment, the technical computing program performs operations on the portion of the distributed array assigned to the technical computing environment, which may be stored in a storage location local to the technical computing environment. For example, the technical computing program may perform an operation or calculation that requires data points adjacent or nearby to, but not included in the portion of the distributed array that the technical computing environment is processing or is assigned to process. The present invention automatically caches one or more portions of the distributed array obtained from another technical computing environment.

30 Claims, 9 Drawing Sheets

(56) References Cited

OTHER PUBLICATIONS

Choy, Ron et al, "Parallel MATLAB: Doing it Right," Retrieved from the Internet: www.interactivesupercomputing.com/downloads.pmatlab.pdf (2006).

Markatos, Evangelos P. et al., "Using Processor Affinity in Loop Scheduling on Shared-Memory Multiprocessors," Conference on High Performance Networking and Computing, Proceedings of the 1992 ACM/IEEE Conference on Supercomputing, pp. 104-113 (1992).

Menon, Vijay et al., "MultiMATLAB: Integrating MATLAB with High-Performance Parallel Computing," Proceedings of the 1997 ACM/IEEE Conference on Supercomputing, pp. 1-18 (1997).

Moler, Cleve, "Why there isn't a parallel MARLAB," Retrieved from the Internet: http://www.mathworks.com/company/newsletters/news_notes/pdf/spr95clefe.pdf.

Trefethen, A. et al, "MultiMATLAB: MATLAB on Multiple Processors," Retrieved from the Internet: http://www.cs.cornell.edu/Info/People/Int/multimatlab.html.

International Search Report for Application No. PCT/US2005/033069, dated Sep. 5, 2006.

* cited by examiner

CACHING AND DECACHING DISTRIBUTED ARRAYS ACROSS CACHES IN A PARALLEL PROCESSING ENVIRONMENT

RELATED APPLICATIONS

This present application is a continuation-in-part of and claims priority to U.S. patent application Ser. No. 10/940,152, entitled "Methods and Systems For Executing A Program In Multiple Execution Environments", filed Sep. 13, 2004, which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to technical computing, and, more particularly, to automatically caching in a technical computing environment a portion of a distributed array assigned for processing to another technical computing environment.

BACKGROUND INFORMATION

In a parallel version of MATLAB® or Simulink® from The MathWorks, Inc. of Natick, Mass., a single computer program may be executed in multiple technical computing environments on one or more computers or processors. Each of the technical computing environments may perform processing of a portion of a set of data to distribute data processing. That is, the same program may run on multiple technical computing environments but process different portions of a distributed data set or each process a data set from multiple data sets.

In the case of parallel processing of a distributed array, one technical computing environment may process a portion of the array, such as a first column, and a second technical computing environment may process another portion of the array, such as a second column. In some cases, a distributed array may be too large and would take up too much memory space to be stored in one technical computing environment. In other cases, the parallel program does not need access to the entire distributed array, but only some portions and only some of the time or under certain conditions. That is, having an entire copy of the distributed array may be unnecessary and inefficient with respect to the operations of the parallel program.

The single program running in parallel in each technical computing environment may perform an operation or calculation on the data of the distributed array that requires the program and/or technical computing environment to obtain a portion of data from another technical computing environment to complete the operation or calculation. For example, the single computer program may perform an operation which requires calculations involving nearby or adjacent data points, such as finite difference methods, convolutions, and local image processing. In these types of operations, a technical computing environment may not have the adjacent or nearby data points, or otherwise have the current values of the nearby data points being processed by another technical computing environment. In order to complete the desired operation, the technical computing environment needs to obtain these other data points included in a portion of the distributed array assigned to or stored in another technical computing environment. The technical computing environment may perform message passing to another technical computing environment to obtain a desired portion of the distributed array stored in the other technical computing environment. The message passing consumes computing and network resources.

Furthermore, the technical computing program may perform the same or similar operations on the same data sets which are distributed among multiple technical computing environments. Each time the technical computing program references a portion of the distributed array stored in another technical computing environment, the technical computing environment may need to exchange messages to obtain a copy of the data. This consumes additional computing and network resources to obtain data previously obtained.

SUMMARY OF THE INVENTION

The present invention provides for automatically caching locally in a technical computing environment one or more portions of a distributed array assigned to other technical computing environments for parallel processing. In a parallel programming paradigm, a technical computing program may be executed in parallel in multiple technical computing environments, and process a distributed array. Portions of the distributed array may be decomposed and distributed for processing among multiple technical computing environments. As such, each technical computing environment stores locally at least the portion of the distributed array it was assigned for processing.

The technical computing program may perform operations accessing portions of the distributed array assigned to and/or stored locally in another technical computing environment. For example, the technical computing program may perform an operation that requires data points adjacent or nearby the portion of the distributed array that the technical computing environment is processing or is assigned to process. Upon referencing by the technical computing program an element of the distributed array not available locally, the techniques of the present invention obtains the referenced data from the appropriate technical computing environment and stores it in a local cache. The local cache may include any type of storage associated with and accessible by the technical computing environment running the technical computing program, and the cache is local at least from the perspective that the technical computing environment can access the data in the storage in a manner that has less performance loss or less resource consumption than communicating to another technical computing environment. If the same element of the distributed array is referenced a second or one or more additional times, the technical computing environment can use the copy of the data from the local cache instead of obtaining the data from another technical computing environment. Using this caching technique, the present invention may reduce any performance loss and resource consumption from obtaining the same portion of the distributed array from another technical computing environment multiple times during execution of the technical computing program.

Additionally, the techniques of the present invention provides for de-caching the copy of the portion of the distributed array stored in a storage associated with the technical computing environment. Once a technical computing program changes a portion of the distributed array that is cached, then, since each technical computing environment is executing the same program, it is assumed the other technical computing programs also changed the same portion of the distributed array. Therefore, the cached portion of the distributed array may be stale or no longer represents the current value(s) of the corresponding portions of the distributed array. When the technical computing program assigns a value to a subscript or subscript range of the distributed array cached locally, the present invention will de-cache the subscript or subscript range from the cache.

In one aspect, the present invention is related to a method for caching in a first computing environment one or more portions of a distributed array assigned for processing to a plurality of computing environments, such as technical computing environments. The method provides a first portion of a distributed array assigned for processing by a first computing environment. The first portion of the distributed array is stored locally to the first computing environment. The method includes processing, by the first computing environment, a reference to a second portion of the distributed array assigned for processing to at least a second computing environment. For example, an instruction executed or a message processed by the computing environment may reference an element of the second portion of the distributed array. In response to the reference, the first computing environment obtains the second portion of the distributed array from the second computing environment, and stores the second portion of the distributed array in a storage associated with the first computing environment. The first and second computing environments may be distributed across processors with either of the first or second computing environments running on a first or a second processor.

In another aspect, the method of the present invention includes the first computing environment processing a second reference to the second portion of the distributed array. In response to the second reference, the method provides the second portion of the distributed array from the storage associated with the first computing environment.

In a further aspect of the present invention, the first portion of the distributed array may include any column and/or row of the distributed array, and the second portion may include any of a second column, a second row, a third column, or a third row of the distributed array which may be assigned for processing to a second and/or a third computing environment. In another aspect, the second portion of the distributed array includes a portion of the distributed array within a subscript range adjacent to or nearby the first portion.

In one embodiment, the method of the present invention stores the second portion of the distributed array to the storage associated with the first computing environment only when the subscript range of the second portion comprises a predetermined subscript range of the distributed array. The predetermined subscript range may be configurable via the first or the second computing environment.

In one aspect, the method of the present invention includes de-caching the second portion of the distributed array stored in the storage local to the computing environment. The method includes the step of processing, by the first computing environment, an assignment of a value to an element of the second portion of the distributed array. In response to the assignment, the method indicates the second portion of the distributed array is not available from the storage associated with the first computing environment. The method may remove or delete the second portion, or any element thereof, from the storage.

In another aspect, the present invention relates to a device readable medium holding device readable instructions to execute the steps of the method, as described above, for caching in a first computing environment one or more portions of a distributed array assigned for processing to a plurality of computing environments.

In an additional aspect, the present invention relates to a distribution system for transmitting device readable instructions to execute the steps of the method, as described above, for caching in a first computing environment one or more portions of a distributed array assigned for processing to a plurality of computing environments.

In one aspect, the present invention relates to a system for caching in a first computing environment one or more portions of a distributed array assigned for processing to a plurality of computing environments, such as technical computing environments. The system comprises a first computing environment having a first portion of a distributed array stored locally for processing by the first computing environment. The system also includes an array cache and array caching mechanism. The array cache provides storage for one or more portions of the distributed array for access by the first computing environment. The array caching mechanism stores the one or more portions of the distributed array to the array cache.

The array caching mechanism of the present invention obtains the second portion of the distributed array from the second computing environment and stores the second portion in the array cache in response to a reference to a second portion of the distributed array stored in a second computing environment. The system may be distributed to a plurality of computing environments executing on one or more processors For example, the first computing environment or the second computing environment may execute on either a first processor or a second processor. Each computing environment may also include an array caching mechanism and local array cache.

In another aspect of the present invention, the second portion of the distributed array is provided by the array cache in response to a second reference to the second portion of the distributed array. The first portion may include at least a first column and/or a first row of the distributed array, and the second portion may include at least a second column, a second row, a third column, or a third row of the distributed array. In one embodiment, the second portion further comprises a portion of the distributed array assigned for processing to a third computing environment.

In a further aspect, the system of the present invention de-caches the second portion from the storage associated with the first computing environment when a value is assigned to an element of the second portion. For example, in response to assigning a value to an element of the second portion of the distributed array, the array caching mechanism removes the second portion of the distributed array from the array cache. In some embodiments, the second portion comprises a portion of the distributed array within a subscript range adjacent to or nearby the first portion.

In some embodiments, the array caching mechanism of the present invention stores the second portion of the distributed array to the storage associated with the first computing environment only when the subscript range of the second portion includes a predetermined subscript range of the distributed array. The predetermined subscript range may be configured via either the first or the second computing environment.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1A:
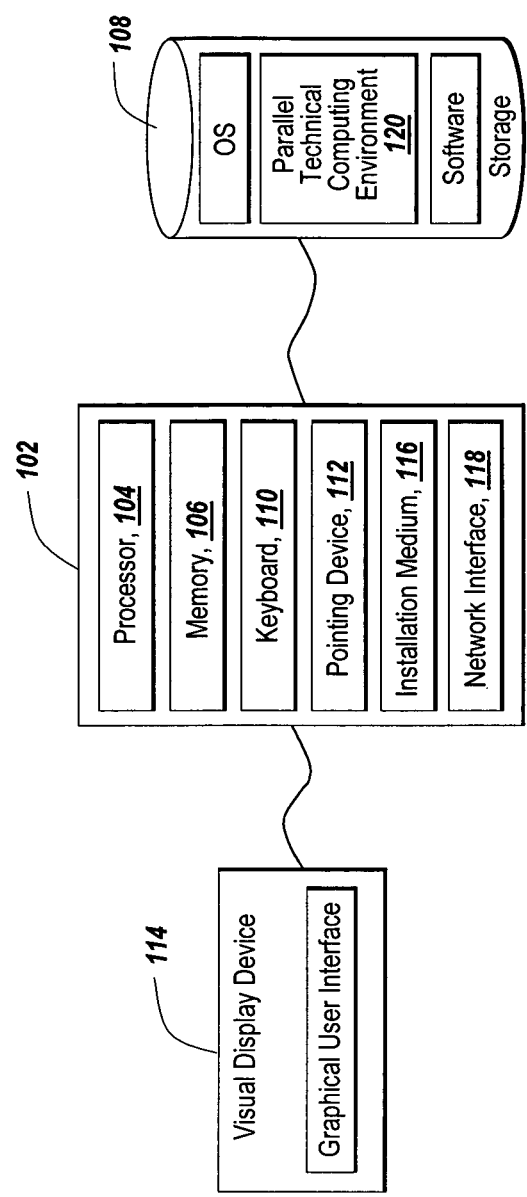
FIG. 1A is a block diagram of a computing device for practicing an illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides for caching locally to a technical computing environment one or more portions of a distributed array assigned to other technical computing environments for processing. A set of executable instruction, such as a technical computing program or script, may be executed to run in parallel in multiple technical computing environments. For example, the technical computing program may be invoked once in a first technical computing environment, and from the invocation the same computer program may be executed in parallel in multiple technical computing environments. Additionally, the technical computing program may process a distributed array, which is an array that is decomposed and distributed for processing among multiple technical computing environments. That is, each technical computing environment is assigned a portion of the distributed array for processing. As the technical computing program runs on each technical computing environment, the technical computing program performs operations on the portion of the distributed array assigned to the technical computing environment, which may be stored in a storage location local to the technical computing environment. The distributed array may be distributed by any size and/or shape of data, such as by columns, rows, or any other desired portions.

In some embodiments, the technical computing environment may desire to access portions of the distributed array assigned to and/or stored locally in another technical computing environment. For example, the technical computing program may perform an operation or calculation that requires data points adjacent or nearby to, but not included in the portion of the distributed array that the technical computing environment is processing or is assigned to process. The illustrative embodiment of the present invention provides systems and methods for automatically caching one or more portions of the distributed array obtained from another technical computing environment. For example, upon referencing by the technical computing program an element of the distributed array not available locally, the technical computing environment obtains the referenced data from the appropriate technical computing environment and stores it in a local cache. If the same element of the distributed array is referenced a second or one or more additional times, the technical computing environment can use the copy of the data from the local cache instead of obtaining the data from another technical computing environment. In this manner, the present invention reduces the performance loss and resource consumption of obtaining a portion of the distributed array from another technical computing environment multiple times during execution of the technical computing program.

Additionally, the illustrative embodiment of the present invention provides systems and methods to de-cache or no longer use the copy of the portion of the distributed array stored in a local cache of a technical computing environment. In a parallel programming paradigm of a Single Program Multiple Data or Distributed Data (SPMD or SPDD) model, each technical computing environment is assumed to be effectively running the same technical computing program. Once a technical computing program changes a portion of the distributed array that is cached, then it is assumed the other technical computing environments also changed the same portion of the distributed array. Therefore, the cached portion of the distributed array may be stale or no longer represent the current value(s) of elements of the distributed array. When the technical computing program assigns a value to an element of the distributed array cached locally, the present invention will de-cache the cached portion or no longer use the cached portion for further processing. For any subsequent references to this element of the distributed array, the technical computing environment may obtain the current values of this portion of the distributed array from the appropriate technical computing environment, and also process to apply again the caching techniques of the present invention The illustrative embodiment will be described solely for illustrative purposes relative to a technical computing environment provided by the software products from The MathWorks, Inc. of Natick, Mass. Although the illustrative embodiment may be described relative to a MATLAB® based technical computing environment, such as a MATLAB® parallel technical computing environment, one of ordinary skill in the art will appreciate that the present invention may be applied to other environments, such as any environments using software products of LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, Mathematica® from Wolfram Research, Inc. of Champaign, Ill., Mathcad from Mathsoft Engineering & Education Inc., or Maple™ from Maplesoft, a division of Waterloo Maple Inc.

FIG. 1A depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals.

The computing device 102 may support any suitable installation medium 116, a CD-ROM, DVD-ROM, floppy disks, tape device, USB device, hard-drive, or any other device suitable for installing software programs such as the present invention of a parallel technical computing environment 120. The computing device 102 may further comprise a storage device 108, such as a hard-drive or CD-ROM, for storing an operating system and other related software, and for storing application software programs such as the parallel technical computing environment 120 of the present invention. Additionally, the operating system and the parallel technical computing environment 120 of the present invention can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The illustrative embodiment of the present invention provides a parallel technical computing environment 120 for executing technical computing programs, such as computer programs created in the technical computing programming language of MATLAB®. The parallel technical computing environment 120 can be an application, module, service, software component or any other type of computer program which is designed to and capable of executing a program supported by the parallel technical computing environment 120, for example such as a computer program written in the programming language of MATLAB®executed in the command window of a MATLAB® session. Furthermore, the parallel technical computing environment 120 of MATLAB® may be configured to and capable of running any of the modules, libraries or software components of the MATLAB® product family. As such, the parallel technical computing environment 120 may have all or a portion of the software components of MATLAB® installed on the computing device 102, or alternatively, accessible from another computing device 102' on a network.

In one aspect, the parallel technical computing environment 120 provides an execution environment from which a computer program can be invoked and executed, for example, via a command window, command line interface, or shell environment. From the command line interface of the parallel technical computing environment 120, commands can be typed in at the command line for execution by the parallel technical computing environment 120 to run programs, functions, scripts, enter data and any other command MATLAB® may be configured to execute. Furthermore, the execution environment provided by the parallel technical computing environment 120 may provide for execution of programs by a variety of other means, such as via a menu item on a graphical user interface, a shortcut in the desktop environment of MATLAB® or the operating system, or via another computer program written to interface with the execution environment to invoke a program.

Figure 1B:
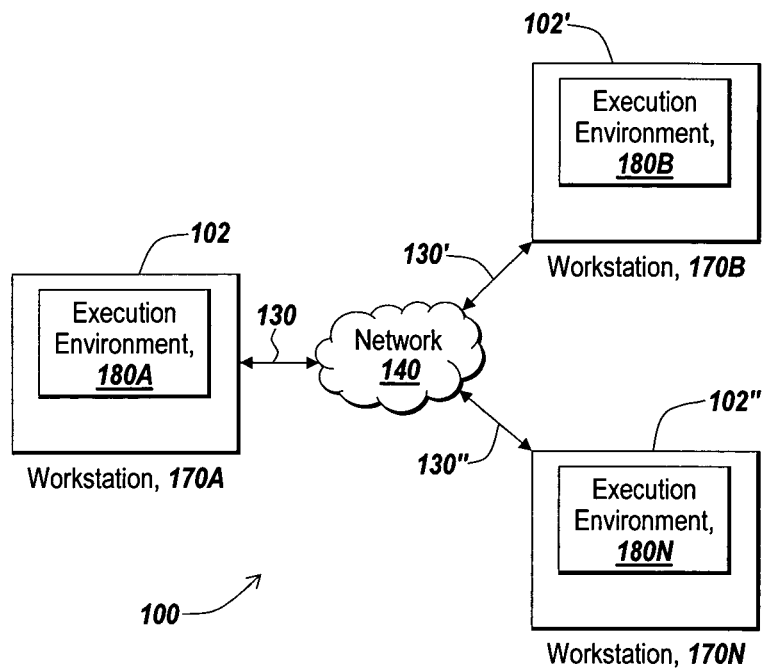
FIG. 1B is a block diagram of a distributed computing system for practicing an illustrative embodiment of the present invention.

FIG. 1B depicts a networked parallel technical computing environment suitable for practicing an illustrative embodiment of the present invention. The execution environments provided by the parallel technical computing environment 120 are deployed in a distributed client-server system on a network. In a broad overview, the system 100 depicts a multiple node network 140 for executing a computer program in multiple execution environments 180a-180n. The system 100 includes multiple workstations 170a-170n connected to and communicating over a network 140. The system 100 may have one or more workstations 170a-170n, each communicating over a network 140 and with any other workstation 170a-170b.

The topology of the network 140 over which the workstations 170a-170n communicate may be a bus, star, or ring network topology. The network 140 can be a local area network (LAN), a metropolitan area network (MAN), or a wide area network (WAN) such as the Internet. In one embodiment (now shown), the network 140 is separated into networks 140 and 140'. The networks 140 and 140' can be the same type of network or different types of networks. In one embodiment, the network 140 and/or the network 140' is, for example, a local-area network (LAN), such as a company Intranet, or a wide area network (WAN), such as the Internet or the World Wide Web. The network 140 and network topology may be of any such network 140 or network topology capable of supporting the operations of the present invention described herein.

The workstation nodes 170a-170n can connect to the network 140 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

Each of the workstations 170a-170n can be any type of computing device (102, 102" and 102'") as described above and respectively configured to be capable of computing and communicating the operations described herein. Each of the workstations 170a-170n may be configured to and capable of running an execution environment 180a-180n of the present invention of a parallel technical computing environment 120, and to operate each execution environment 180a-180n on the operating system and processor architecture that may be running on the computing device (e.g., 102, 102', and 102"). In summary, the execution environment 180a-180n and the parallel technical computing environment 120 may be deployed across a wide range of different computing devices, different operating systems, and different processors in various network topologies and configurations.

The parallel technical computing environment 120 may execute a program that processes distributed arrays. A distributed array may be decomposed into multiple portions, with each portion assigned and distributed for processing to separate execution environments.

For example, a 300-by-300 distributed array may be distributed across the execution environments 180a-180n of system 100 illustrated in FIG. 1B. A first portion of the distributed array, for example the first 100 columns, may be stored, and processed on the first execution environment 180a. A second portion of the distributed array, for example, the second 100 columns, may be stored, and processed on the second execution environment 180b and a third portion of the distributed array, for example, the last 100 columns, may be stored, and processed on the third execution environment 180n. A distributed array may be distributed among the execution environment 180a-180n by any type of distribution scheme and by any dimension of the array, such as a row-based, column-based, or a multiple-dimension based scheme.

The contents of a distributed array assigned to and stored on a particular execution environment 180a-180n is referred to as the local portion of the array with respect to the particular execution environment 180a-180n. Each execution environment 180a-180n may execute a program, such as a SPDD or SPMD type program, that has the execution environment 180a-180n perform operations on its local portion of the array. As such, no communication between the execution environments 180a-180n may be necessary for the processing of the local portion of the array. In other cases, the program may perform an operation that requires processing a portion of the array not contained in the local portion of an execution environment 180a-180n but in the local portion of another execution environment 180a-180n. This may require communications between execution environments 180a-180n in order for one execution environment 180a to obtain one or more elements of the distributed array stored in one or more other execution environments 180a-180n, i.e., the local portions of the array of other execution environments 180a-180n.

Figure 2A:
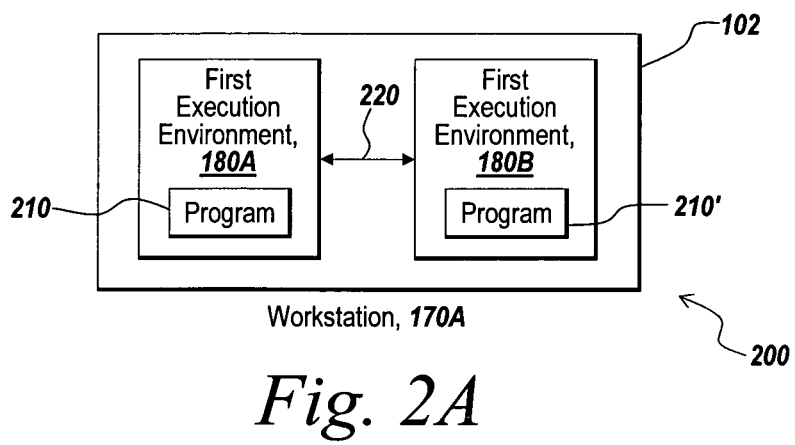
FIG. 2A is a block diagram of the environment of an embodiment of the present invention in a computer system.

FIG. 2A depicts another illustrative embodiment of an execution environment of a parallel technical computing environment 120 referencing an interface between execution environments 180a and 180B. In brief overview, the system 200 of the parallel technical computing environment 120 is a single node computing device 102 of workstation 170A, which may be a single, dual, or multi-processor computing device 102. A first execution environment 180a and a second execution environment 180b of workstation 170A are capable of communicating to each other via an interface 220. The interface 220 may comprise a message passing interface 210, such as MPI provided by the MPI Forum, a socket based communications interface implementing a custom message specification, a file-based interface mechanism, or any other type and/or form of suitable interface.

Each of the first executing environment 180a and second execution environment 180b is capable of executing a computer program 210 or any executable instruction that can be invoked and executed within the execution environment 180a-180b, such as a program 210 processing one or more distributed arrays. In operation, the computer program 210 is invoked from the first execution environment 180a so that it is executed on the first execution environment 180a and also executed on the second execution environment 180b. The program 210 may be a SPDD or SPMD type program from which portions of a distributed array are provided to each execution environment 180a-180b. The program 210 may execute on the first executing environment 180a processing a first portion of the array and the program 210 may execute on the second execution environment 180b processing a second portion of the array. Executions environments 180a-180b may communicate with each other via the interface 220 to obtain portions of the array that the other environment 180a-180b may have. For example, the first execution environment 180a may send a message to the second execution environment 180b to obtain the value or values of a subscript or subscript range of the local portion of the second execution environment not available in the first execution environment 180a. A subscript or subscript range refers to an index of or identifier to an element or set of elements of the distributed array. In response to the message, the second execution environment 180b may send a message, such as a reply message, to the first execution environment 180a to provide a portion of the local array of the second execution environment 180b having the desired subscript or subscript range.

Figure 2B:
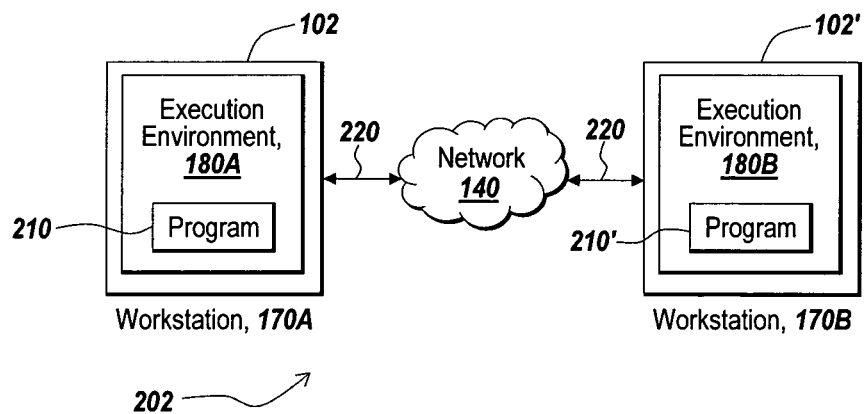
FIG. 2B is a block diagram of the environment of an alternative embodiment of the present invention in a networked computer system.
Figure 2C:
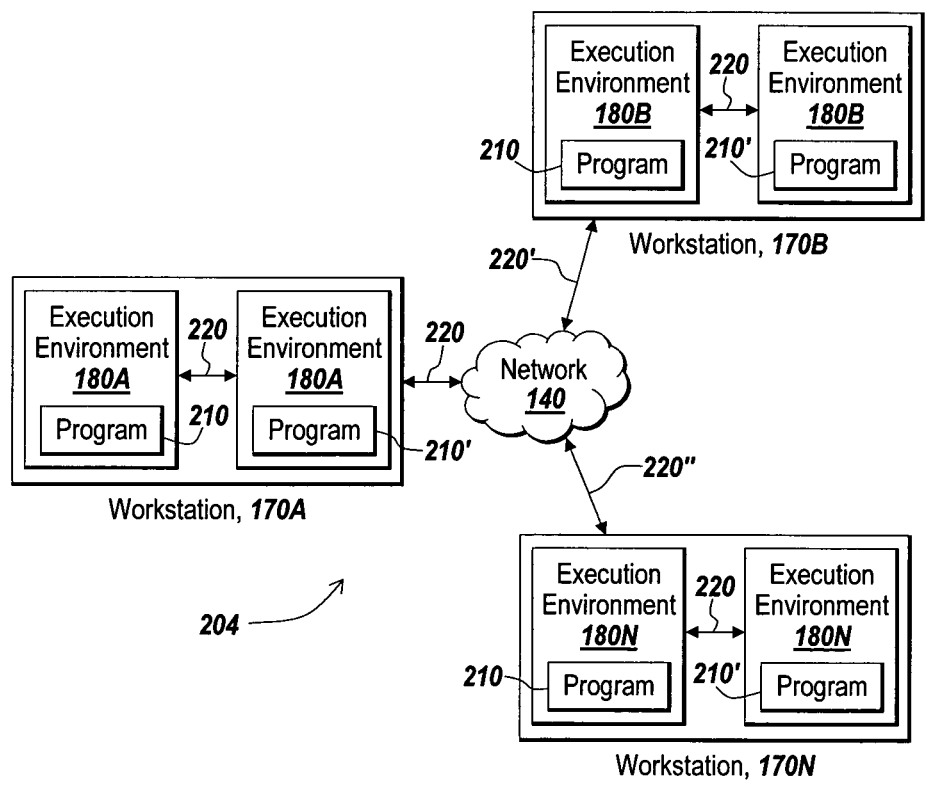
FIG. 2C is a block diagram of the environment of another embodiment of the present invention in a distributed network computer system.

Referring now to FIGS. 2B and 2C, the present invention of a parallel technical computing environment 120 can be distributed to multiple execution environments 180a-180n running in multiple nodes of a network 140. As shown in FIG. 2B, the present invention as shown in FIG. 2A can be practiced in a two-node networked computer system 202. In brief overview, the system 202 has a workstation 170a and a workstation 170b each a computing device 102, 102' as described above. The workstations 170a and 170b are connected to and communicating over a network 140, and each have and can run an execution environment 180a and 180n. Each of the execution environments 180a-180b can interface 220 to each other over the network 140 to send and receive a message or messages for executing a program 210, and in further embodiments for sharing data and other information related to executing the program 210. In operation of the system 202 in FIG. 2B, a program 210 is invoked in the execution environment 180a, which in response to and upon the execution request, sends a message via the interface 220 to the execution environment 180b on workstation 180b to execute the program 210. The execution environments 170a and 170b execute the program 210 respectively on each workstation 180a and 180b.

Referring now to FIG. 2C, the present invention of the parallel technical computing environment 120 can be deployed in a variety of nodes and processors across the network 140. In overview of the multi-node networked system 204 of FIG. 2C, there are multiple workstations 170a-170n connected and communicating over a network 140.

Each workstation 170a-170n can have multiple execution environments 180a-180n, with each execution environment 180a-180n able to communicate with the other execution environments via an interface 220 locally or over the network 140. In operation of the system 204, a program 210 is invoked on one of the execution environments, for example 180a. Through the interface 220, all of the execution environments, such as 180a' and 180b-180n', are sent a message from the first execution environment 180a to execute the program 210. All of the execution environments 180a-180n execute the program 210. With one invoking of a program 210 in one execution environment 180a, the processing and computing capabilities of all the nodes and execution environments 180a-180n in the network are utilized. In the above examples, each of the execution environments 180a-180n may process a local portion of a distributed array and obtain others portions of the array via an interface 210 to other execution environments 180a-180n.

In one aspect, any portion of the distributed array may be cached by an execution environment 180a-180n using the techniques of the present invention. For example, execution environment 180a may be assigned column 1 of a three column distributed array with execution environments 180b and 180c assigned columns 2 and 3 respectively. Execution environment 180a may execute a program 210 that performs an operation needing values from columns 2 and 3 of execution environment 180b and 180c respectively. In one embodiment, upon distribution of the array to form local portions of the array in respective execution environments 180a-180n, each execution environment 180a-180n may cache a portion of the distributed array not included in their local portion of the array. In another embodiment, upon executing an instruction requiring a portion of the distributed array of another execution environment 180a-180n, the execution environment 180a-180n obtains via an interface 220 the desired portion of the array from another execution environment 180a-180n. The execution environment 180a-180n may store the obtained portion locally in a cache or with the local portion of the array for subsequent processing. For example, upon executing another instruction requiring the same portion of the distributed array, the execution environment 180a-180n can use the locally cached copy instead of using the interface 220 to obtain the same portion of the array again. This avoids any delay and additional resource consumption from interfacing with another execution environment, such as by exchanging messages over a network 140.

Figure 3A:
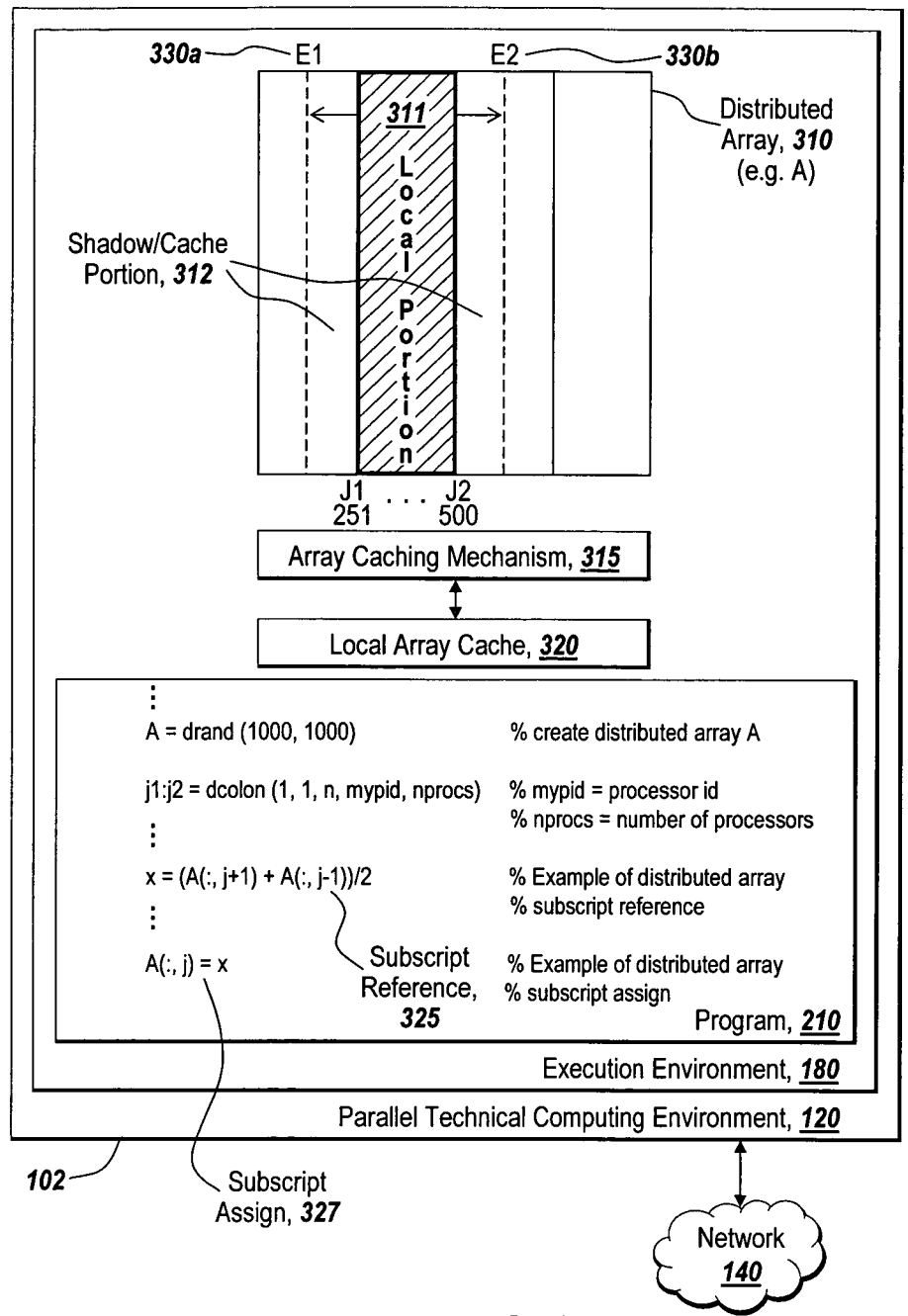
FIG. 3A is a block diagram of the distributed array caching elements of an embodiment of the present invention.

FIG. 3A depicts an illustrative embodiment of an execution environment 180 of a parallel technical computing environment 120 for practicing the distributed array caching techniques of the present invention. In brief overview, the illustrative execution environment 180 provided on computing device 102 includes an array caching mechanism 315 and a local array cache 320 for caching portions of a distributed array 310 used or referenced by a program 210 and that may be assigned, stored, and/or processed by another execution environment 180a-180n. By way of example, the distributed array, e.g., array A, may be a 1000-by-1000 matrix. The local portion 311 of the array 310 for processing by the execution environment 180 may be for example columns 251 to column 500 as referred to by the J1 and J2 subscripts shown in FIG. 3A. The program 210 may be any set of one or more executable instructions, and may comprise a technical computing program. In an exemplary embodiment, the program may comprise interpreted executable instructions of the MATLAB® programming language. The execution environment 180 may provide for any suitable means and/or mechanisms for executing the program 210, such as by a virtual machine, emulator, or interpreter to interpret the instructions of the program 210. For example, in an exemplary embodiment, the execution environment 180 may include a MATLAB® interpreter for interpreting and executing MATLAB® programs and instructions 210.

The array caching mechanism 315 may comprise any suitable means and/or mechanism for detecting or determining when an executable instruction of the program 210 references, uses, or requires a portion of the distributed array 310 that is not available locally in the execution environment 180 and/or is not included in the local portion 311 of the array 310 processed by the execution environment 180. The array caching mechanism 315 may detect or determine when a subscript or subscript range of the distributed array 310 that is not included in the local portion 311 is referenced by an executable instruction of the program 210. The array caching mechanism 315 may also detect or determine when an executable instruction assigns a value or values to a subscript or subscript range of the distributed array 310 not included in the local portion 311. Additionally, the array caching mechanism may be implemented in hardware, software, or any combination of hardware and software.

In one embodiment, the array caching mechanism 315 may be included in the virtual machine or interpreter that interprets and executes the program 210. In an exemplary embodiment of a MATLAB® interpreter, the array caching mechanism 315 may be included in or comprise an implementation of the functions subsref and/or subsasgn provided by the MATLAB® interpreter or as overloaded methods of the subsref and/or subsasgn functions provided by the MATLAB® interpreter. In other embodiments, the array caching mechanism 315 may be incorporated in the underlying structure or implementation of any statements, functions, and other instructions of the language of the program 210. In additional embodiments, the array caching mechanism 315 may be implemented via any type and/or form of code and incorporated via a compiler or linker when providing code or an executable for the program 210. One ordinarily skilled in the art will recognize and appreciate that various ways to implement the array caching mechanism 315 of the present invention suitable for the type and/or form of the execution environment 180 and the program 210.

The local array cache 320 may comprise any type and/or form of storage suitable for holding any information or data, such as a portion of the distributed array 310 and/or information related to the distributed array 310. In one embodiment, the local array cache 320, or array cache, may comprise a data structure in any type and/or form of memory 106 provided by the computing device 102 of the execution environment 180. The array cache 320 may be in any suitable location accessible by the execution environment 180 such that the execution environment 180 can access information in the cache 320 without communicating to another execution environment 180. In another aspect, the array cache 320 may be in any suitable location providing data or information access that has less of a performance loss or resource consumption than accessing information or data from another execution environment 180. In other embodiments, the array cache 320 may comprise a storage location in any type and/or form of storage 108 provided by or via the computing device 102 of the execution environment 180, including, in some cases, via a network. The array cache 320 may be implemented in hardware, software, or any combination of hardware and software. One ordinarily skilled in the art will recognize and appreciate that the array cache 320 may be implemented in various forms and permutations, and may be accessible by any suitable means and/or mechanism by an execution environment 180.

By way of illustration, the program 210 of FIG. 3A may comprise the following instructions:

```
A = drand (1000, 1000)        % create distributed array A
j1:j2 = dcolon                % mypid = processor id
(1, 1, n, mypid, nprocs)      % nprocs = number of processors
x = (A(:, j + 1) + A(:, j – 1))/2   % Example of distributed array
                              % subscript reference (325, FIG. 3A)
A(:, j) = x                   % Example of distributed array
                              % subscript assign (327, FIG. 3A)
```

The above instructions create a random m-by-n, e.g., a 1000 by 1000, distributed array 310 via the drand function call. Data distribution and indexing, e.g. j1:j2, of the distributed array 310 on each execution environment 180a-180b may be based on a dcolon or distributed colon operator. If distributed array A 310 is an m-by-n matrix distributed by columns, i.e., n, the indices J1 through J2 of the local portion 311 stored in the execution environment 180a-180n identified by mypid are determined by "dcolon(1, 1, n, mypid, nprocs)." For this illustrative dcolon operator, the first argument is the starting index value for the array 310, the second argument is the delta or increment index value, the third argument indicates the type of distribution such as by columns, the fourth argument identifies the current execution environment, and the fifth argument identifies the number of execution environments receiving a portion of the distributed array. For example, a 1000-by-1000 matrix distributed by columns on four processors or four execution environments 180a-180d may have columns 1:250, i.e., indices j1:j2=1:250, stored on the first execution environment 180a, columns 251:500 on the second execution environment 180b, columns 501:750 on the third execution environment 180c, and the columns 751:1000 on the fourth execution environment 180d. Those ordinarily skilled in the art will recognize and appreciate the dcolon operator is illustrative, and the decomposition and indexing of the distributed array may be implemented in many other forms and permutations.

The program 210 of FIG. 3A also illustrates an example of an executable instruction referencing or using a portion of the distributed array 310, referred to as a subscript reference 325, or in the exemplary embodiment of MATLAB® interpreter, a subsref. The program 210 illustrates an example of an executable instruction assigning a value to a portion of the distributed array 310, referred to as a subscript assign 327, or in the exemplary embodiment of a MATLAB® interpreter, a subsasgn. Subscript reference 325 and subscript assign 327 instructions of the program 210 can be utilized by the array caching mechanism 315 to detect or determine when a portion of the distributed array 310 not stored in the local portion 311 is needed or requested by the program 210.

In one aspect, the present invention is directed towards automatically caching or shadowing one or more portions of the distributed array 310 that are not stored in or provided by the local portion 311. Extension indices, such as extension widths, may be associated with the distributed array 310 in order to identify the portions of the distributed array not included in the local portion 311 to automatically cache or shadow. In FIG. 3A, the extension indices 330a and 330b are referred to as indices e1 and e2. These extension indices extend the portions of the distributed array 310 to be stored or available locally to the execution environment 180. The extension indices 330a-330b may be implemented by or included in the underlying data structure representing the distributed array 310, such as the darray data structure in an exemplary embodiment of MATLAB®. In FIG. 3A, the extension indices 330a-330b are illustrated as column based extensions to indicate the portion 312 of the distributed array 310 to be shadowed or cached.

The extension indices 330a-330b may be specified in any suitable manner, and may be specified as relative values to the indices or array subscripts of the local portion 311, e.g., j1:j2. For example, in one embodiment, the extension index e1 330a may be specified with a value of 10 indicating the cache portion 312 comprises 10 subscript range indices to the left of j1 of the local portion 311, or subscript range 240 to 250 of distributed array 310. Likewise, the extension index e2 330b may be specified with a value of 10 indicating the cache portion 312 comprises 10 subscript range indices to the right of j2 of the local portion 311, or subscript range 501-510 of distributed array 310. In other embodiments, the extension indices 330a-330b may be specified as values relative to or absolute to the subscript range of the distributed array 310.

During any portion of executing program 210 or processing the distributed array 310, the range of indices of the distributed array that may be stored or available locally to the execution environment 180 may be referred to or expressed as:

$$j1-e1:j2+e2$$

In some embodiments, the extension indices 330a-330b may be initially set to 0. The extension indices 330a-330b may be set, changed, or otherwise provided statically or dynamically by any suitable means and/or mechanisms. In one embodiment, the extension indices 330a-330b may be dynamically changed to include the cached portion 312 on an as needed basis by a program 210. For example, the extension indices 330a-330b may be initially set to 0 and the execution environment 180 executes an instruction loading an index that is one column away from the local portion 311. The extension indices e1 330a and/or e2 330b may be increased or changed dynamically from 0 to 1 to account for caching or shadowing the column(s) adjacent to the local portion 311 to form the cached portion 312. In other embodiments, the extension indices 330a-330b and the cached portion 312 may be fixed, such as upon starting the execution environment 180, or upon creating the distributed array 310.

In some embodiments, the extension indices 330a-330b may comprise configurable properties of the distributed array 310 which may be provided programmatically via any type and/or form of application programming interface (API). For example, the distributed array 310 may comprise an object-based or object-oriented representation in the execution environment 180 or technical computing environment 120 from which methods and/or properties may be used to specify the extension indices 330a-330b.

In other embodiments, the array caching mechanism 315 specifies or changes the extension indices 330a-330b according to any logic, business rules, or other functionality by which the array caching mechanism 315 determines to cache or shadow a portion 312 of the distributed array 310. In an exemplary embodiment, the array caching mechanism 315 may be designed, constructed, or configured to automatically cache any subscript reference to load or store an index outside of the local portion 311 but nearby or near the local portion 311. For example, any index within twice the width of the local portion 311 may be automatically cached upon the first reference to load or store an index within a subscript range. One ordinarily skilled in the art will recognize and appreciate that the array caching mechanism 315 may cache any configured, set, or otherwise predetermined subscripts or subscript ranges of the distributed array 310.

In one embodiment, the extension indices 330a-330b represent the index or subscript range of the cached portion 312 as determined and cached by the array caching mechanism 315. The array caching mechanism 315 may be configured to automatically cache any "nearby" portion of the distributed array 310 not included in the local portion 311. The array cache mechanism 315 may be configured by any suitable configuration mechanism and/or means to specify what is "nearby", which may be relative to the size of the distributed array 310 and the local portion 311 assigned to the execution environment 180. The "nearby" portion may comprise any portion of the distributed array 310, including all of the remaining portions outside the local portion 311. In these cases, the extension indices 330a-330b may be dynamically adjusted to represent the nearby portion 312 cached by the array caching mechanism 315.

In other cases, the extension indices 330a-330b may specify to the array caching mechanism 315 the portion 312 of the distributed array 310 to be cached. That is, the extension indices 330a-330b associated with a distributed array 310 indicate to the array caching mechanism what portions to cache. In these cases, the extension indices 330a-330b represent the indices of the cached portion 312, and also a configuration parameter for the array caching mechanism 315 to use to determine the indices of the distributed array 310 to cache. One ordinarily skilled in the art will recognize and appreciate that the extension indices 330a-330b may represent either or both the indices of the distributed array to cache or the indices of the distributed array that have been cached.

Furthermore, the extension indices 330a-330b may be specified as any type and/or form of numerical, character, or other data representation suitable for representing an index or identifying the cached portion 312 of the distributed array 310. In an exemplary embodiment, the extension indices 330a-330b are specified as integer values. In some embodiments, the extension indices 330a-330b may be specified as a positive or negative number to indicate direction of the extension relative to the indices of the local portion 311. One ordinarily skilled in the art will recognize and appreciate that the extension indices of the present invention may comprise a wide range of different types of representations and formats.

Although shown as a pair of extension indices 330a-330b, there may be only one extension index 330a or 330b, and in other cases, multiple extension indices. Additionally, although extension indices e1 and e2 330a-330b are generally described as having the same value to form a symmetrical extension of the cached portion 312 with respect to the local portion 311, the extension indices 330a-330b may be provided to form asymmetrical extensions. That is, extension index e1 330a may be set to a different value than extension index e2 330b, or any other extension index that may be used.

Figure 3B:
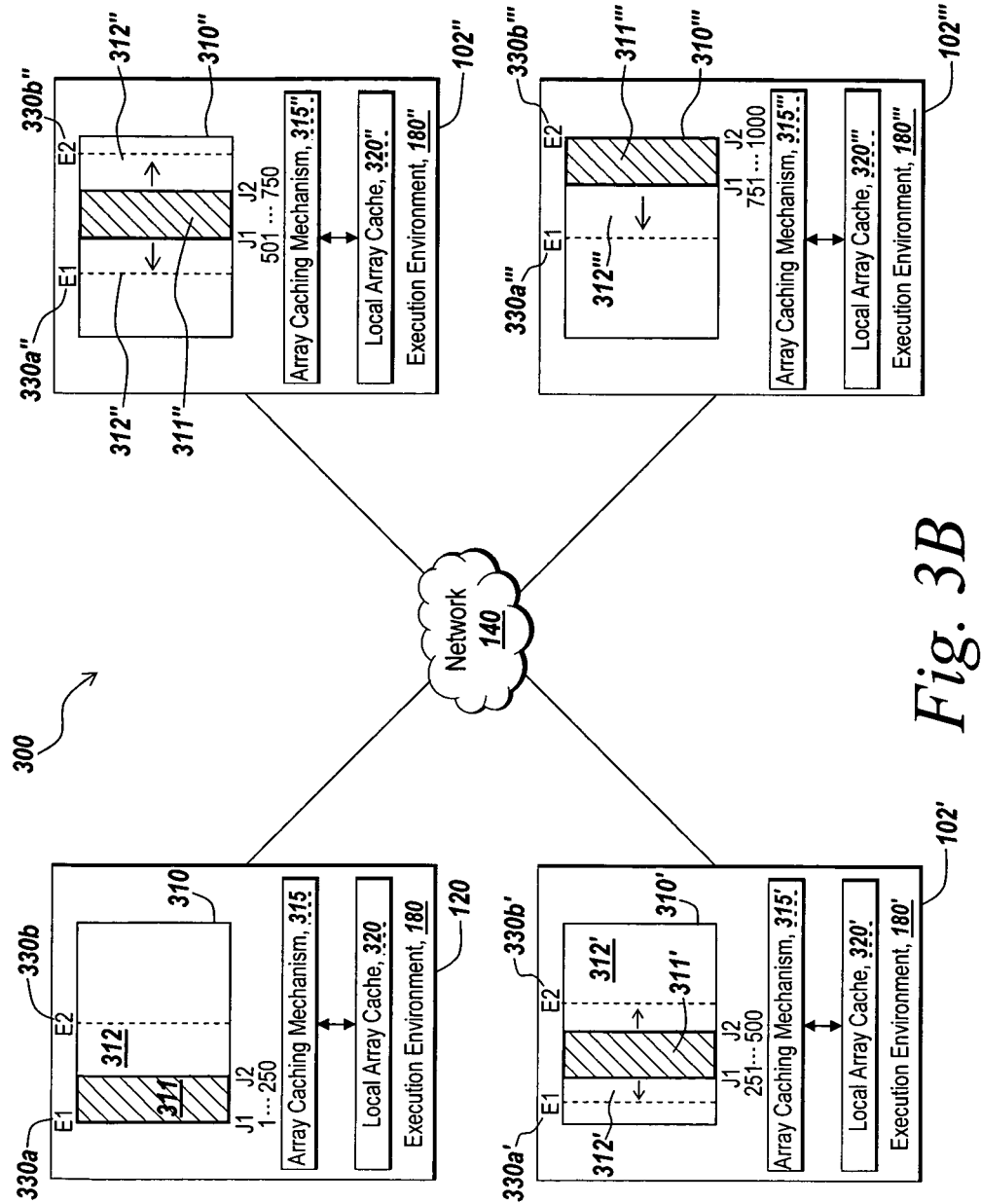
FIG. 3B is a block diagram of the distributed array caching elements of an embodiment of the present invention practiced in an environment of FIG. 2A, 2B or 2C.

FIG. 3B depicts a system 300 of a networked parallel technical computing environment of the present invention illustrating the respective local portions 311-311''' and cached portions 312-312''' of distributed array 310 in each execution environment 180-180'''. In brief overview, four computing devices 102-102''' are connected to and communicating over a network 140. Each computing device 102-102''' provides an execution environment 180-180''' for executing a program 210 in parallel, such as a program processing a distributed array 310 as described in FIG. 3A. Each execution environment 180-180''' comprises an array caching mechanism 315-315''' and a local array cache 320-320''' for caching portions of the distributed array 310 in a cached portion 312-312''' as identified by respective extension indices 330a-330b'''. FIG. 3B continues the example of the distributed array 310 of FIG. 3A being processed on four execution environments 180-180''' and the distributed array 310 being distributed by columns to each execution environment 180-180'''.

For the first execution environment 190 on computing device 102, the local portion 311 comprises the first 250 columns of the distributed array 310 as indicated by indices j1:j2 of 1:250. The cached portion 312 is specified by extension indices e1 and e2 330a-330b. Since the first index of the local portion 311 is on a boundary of the distributed array 310, the extension index 330a may be set to 0. In other embodiments, the extension index e1 330a may be set to a value greater than 0, such as the value of extension index e2 330b but may be effectively ignored for caching purposes. In other embodiments, the extension index e1 330a may be set to effectively wrap the cached portion 312 around to the end of the subscript range of the distributed array 310, e.g., j1:j2 of 751-1000.

For the second execution environment 180' on computing device 102', the local portion 311' comprises the second 250 columns of the distributed array 310 as represented by indices j1:j2 of 251:500. The cached portion 312' is specified by extension indices e1 and e2 330a'-330b'. Likewise, for the third execution environment 180'' on computing device 102'', the local portion 311'' comprises indices j1:j2 of 501 to 750, and the cached portion 312'' is specified by extension indices e1 and e2 330a''-330b''. Also, the local portion 311''' of the fourth execution environment 180''' on computing device 102''' comprises indices j1:j2 of 751 to 1000, and the cached portion 312'' is specified by extension indices e1 and e2 330a'''-330b'''. Since the last index of the local portion 312''' is on a boundary of the distributed array 310, the extension index 330b''' may be set to 0. In other embodiments, the extension index e1 330b''' may be set to a non-zero value but may be effectively ignored for caching purposes. In other embodiments, the extension index e3 330b''' may be specified with a non-zero value that effectively wraps the cached portion 312''' around to the start of the subscript range of the distributed array 310, e.g., j1:j2 of 1:250.

In some embodiments, memory and/or storage for all the elements of the distributed array 310 is allocated on each of the execution environments 180-180'''. Each execution environment 180-180'' may allocate memory to store or hold all or most of the elements of the distributed array 310. In one embodiment, each execution environment 180-180''' allocates memory for the entire distributed array 310 and de-allocates portions of the memory in accordance with the assigned distribution and indexing of the distributed array. In other embodiments, memory and/or storage is allocated only for the local portion 310 of the distributed array 310 assigned for processing to the respective execution environment 180-180'''. That is, each execution environment 310 may allocate memory to store or hold the elements of the distributed array 310 forming the local portion 310. In a further embodiment, each execution environment 310 may allocate memory related to the distributed array 310 to store or hold the elements of the distributed array 310 forming the local portion 311 and the desired cached portion 312.

In some cases, the local array cache 320 is allocated in the same memory and/or storage associated with the local portion 311 of the distributed array 310 and/or any data structure, memory or storage otherwise used for allocating the distributed array 310 in the respective execution environment 180-180'''. For example, in one embodiment, the local array cache 320 may comprise elements of a data structure used to implement and/or represent the distributed array 310 in the execution environment 180-180'''. In this embodiment, the array caching mechanism 320 may track and manage caching and de-caching via the data structure representation. Additionally, an array cache 320 may be dynamically created or allocated, and provided for one execution or instance of a program 210, execution environment 180, or technical computing environment 120. In some embodiments, the array cache 320 may be established in a persistent manner across multiple executions or instances of a program 210, execution environment 180, or technical computing environment 120. One ordinarily skilled in the art will recognize and appreciate the various mechanisms and means for providing for memory and/or storage allocation of the distributed array and the local and cached portions of the distributed array.

Although the array caching mechanism 315 and local array cache 320 are generally discussed in terms of handling a single distributed array, the array caching mechanism 315 and local array cache 320 may be used to handle multiple distributed arrays 310 being processed by an execution environment 180, either concurrently, subsequently, or otherwise. For example, a first distributed array and a second distributed array can share the same or a common array cache 320. Additionally, each execution environment 180-180" may have multiple array caching mechanisms 315 and array caches 320, each being the same or different from another. Each array caching mechanism 315 and array cache 320 may be associated with or used for one or more distributed arrays 310. In some embodiments, a single array cache 320 may be used by or shared with multiple array caching mechanisms 315. In other embodiments, a single array caching mechanism 315 may use multiple array caches 320. One ordinarily skilled in the art will recognize and appreciate the various forms and permutations of deploying the array caching mechanism and array cache in one or more execution environments.

Figure 3C:
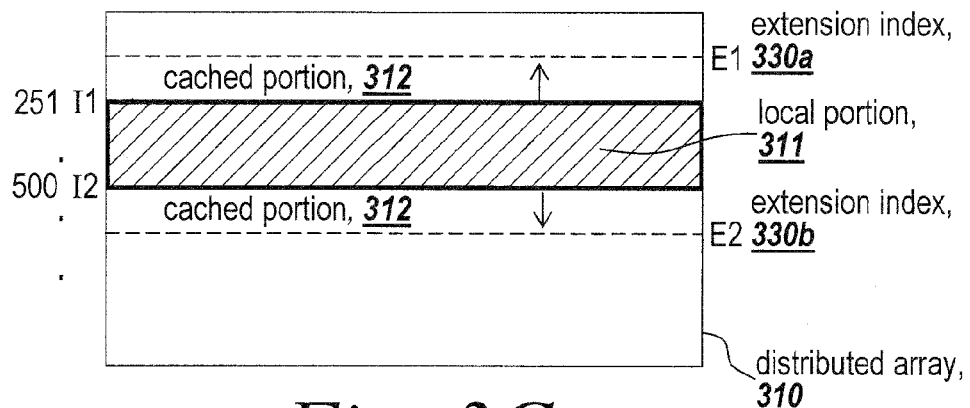
FIG. 3C is a diagrammatic illustration of an alternative embodiment of row-based extension widths of a distributed array for caching in practicing another embodiment of the present invention.
Figure 3D:
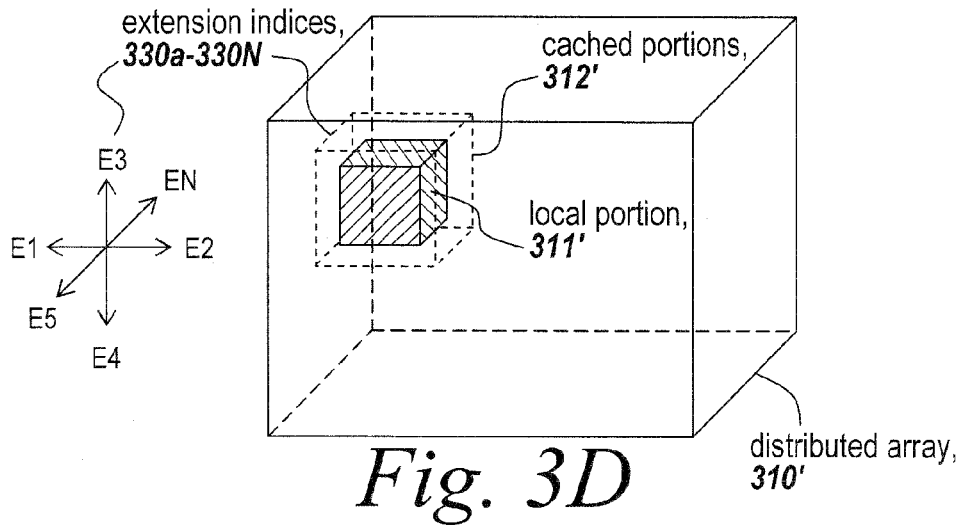
FIG. 3D is a diagrammatic illustration of an alternative embodiment of multiple-dimension-based extension widths of a distributed array for caching in practicing another embodiment of the present invention.
Figure 3E:
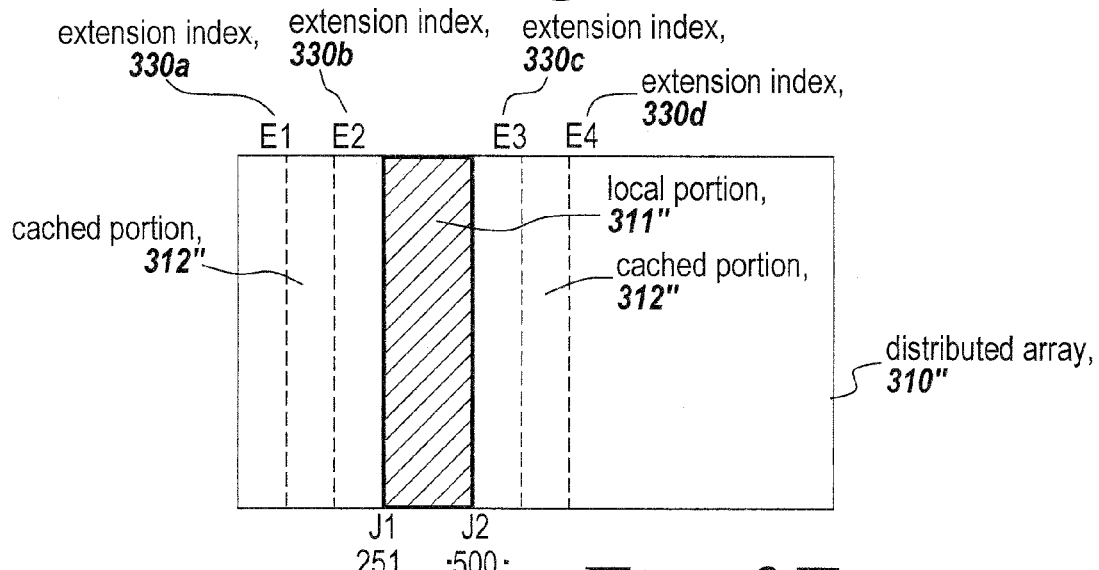
FIG. 3E is a diagrammatic illustration of an alternative embodiment of non-continuous extension widths of a distributed array for caching in practicing another embodiment of the present invention.

Referring now to FIG. 3C, other embodiments of the extensions indices are illustrated for practicing the caching techniques of the present invention. For the distributed array 310, a row based indexing distribution may be used. That is, each execution environment 180-180''' may be assigned to process a portion of the distributed array 310 comprising one or more rows of the array 310. For example, the second execution environment 180' of system 300 in FIG. 3B may process a local portion 311' as identified by row or subscript indices I1:I1 of 251:500. In this example, the extension indices e1 330a' and e2 330b' may represent row-based extension widths to form the cached portion 312'.

Although in exemplary embodiments, the extension indices 330a-330b may represent column or row based extensions of the local portion 311 to form a cached portion 312, the extension indices may represent any one or more dimensions of a multi-dimension array as illustrated by the distributed array 310' of FIG. 3C. The distributed array 310' may be distributed and indexed to form a local portion 311' and a cached portion 312" representing each and/or any of the dimensions of the array 310'. For example, the multi-dimension array 310' may be distributed and indexed for processing on each execution environment 180-180''' by any combination or arbitrary mapping of column ($1^{st}$ dimension), row ($2^{nd}$ dimension) or page ($3^{rd}$ dimension) indices. As such, the techniques of the present invention may use multiple extension indices e1, e2, e3 . . . eN, 330a-330n, to represent and identify the cached portion 312' in each respective execution environment 180-180'''.

Although the extension indices e1-eN 330a-330n are used to provide caching extensions for all the dimensions relative to the local portion 311', not all dimensions, e.g., column, row, and page, of the distributed array 310 may be represented by the extension indices 330a-330n. For example, in some embodiments, only row and column based extension indices 330a-330n, such as e1-e4, may be used. In other embodiments, only page extensions 330a-330n, such as e5-eN, may be used in practicing the technique of the present invention. One ordinarily skilled in the art will recognize and appreciate that any one or more dimensions of a distributed array may be used for indexing operations for providing the local portion, cached portion, and extensions indices in practicing the present invention as described herein.

Furthermore, although the extension indices 330a-330n have been generally illustrated as providing a cached portion 312 adjacent to and continuous from the respective local portion 311, the extension indices 330a-330n may be provided such that the cached portion 312 is not adjacent to and/or continuous from the local portion 311. For example, as illustrated by the distributed array 310" of FIG. 3C, the cached portions 312" identified by extension indices e1-e4 330a-330d may be provided in a manner to form a cached portion 312" that is not adjacent to and/or continuous from the local portion 311". In this embodiment, the caching techniques of the present invention may cache only the portions of the distributed array 310" outside of the local portion 312" that are loaded, stored, or otherwise referenced by an instruction of a program 210, and not any portions that may be included in between the local portion 311" and the cached portion 312" but not used by the program 210.

Figure 4A:
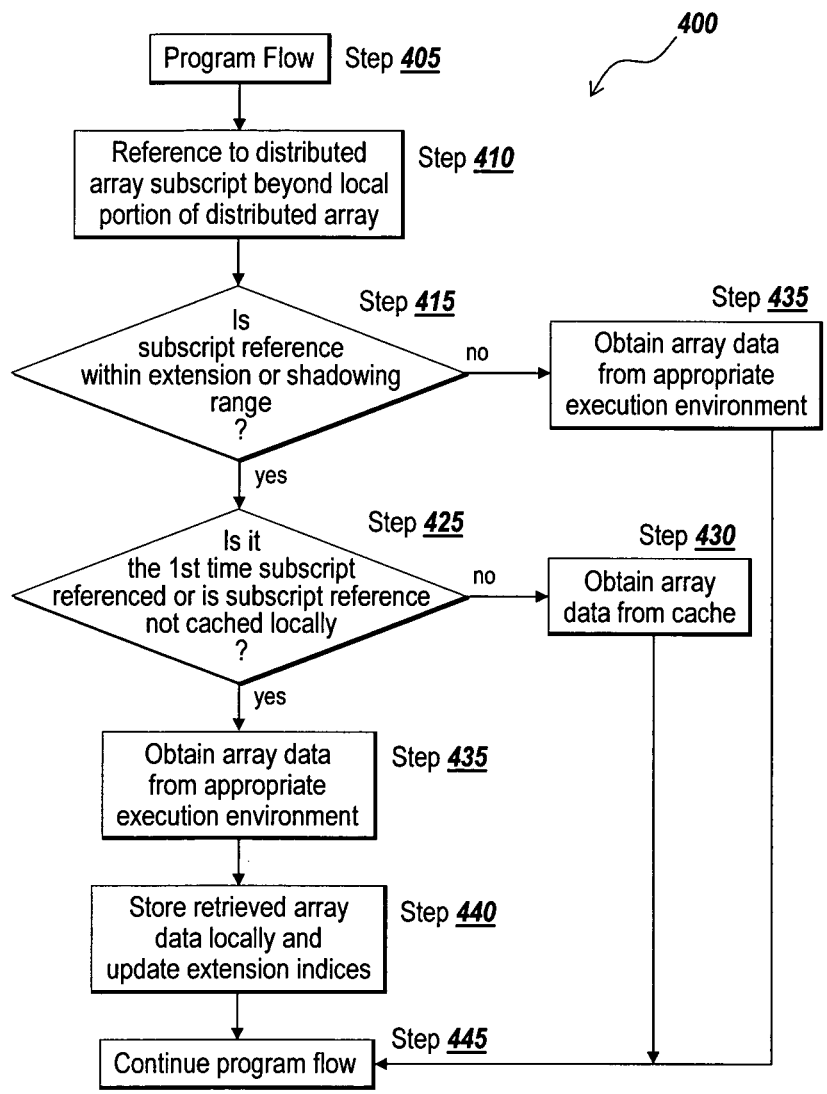
FIG. 4A is a flow diagram illustrating steps performed in practicing the caching techniques of an embodiment of the present invention.

In one aspect, the present invention relates to methods for practicing the caching techniques as described herein. In the flow diagram of FIG. 4A, method 400 depicts the caching operations of the one or more execution environments 180-180''' illustrated in FIGS. 3A and 3B. At step 405, an execution environment 180-180''' is executing a program flow of a program 210 invoked for execution. At some point during the program flow, the array caching mechanism 315 of an execution environment 180, at step 410, detects, recognizes, or interprets a reference to load a portion of the distributed array 310 beyond the local portion 311. For example, an interpreter of the execution environment 180 may interpret an instruction, such as the instruction comprising the subscript reference 325 of the program 210 of FIG. 3A, referencing a subscript or subscript range of the distributed array 310.

At step 415, the execution environment 180 and/or the array caching mechanism 315 evaluates the distributed array subscript reference 325 to determine if the subscript reference 325 is within the desired caching or shadowing index range. In one embodiment, the array caching mechanism 315 is configured with logic or business rules to determine if the subscript reference 325 is for a nearby portion of the distributed array 310 not included in the local portion 311. If the subscript reference 325 is not within the desired caching or shadowing range, the execution environment 180 may need to obtain the portion of the distributed array 310 referenced by the subscript reference 325 from one or more other execution environments 180'-180'''. At step 435, the execution environment 180 may communicate via messaging or any other interface 220 to obtain a copy of the referenced portion of the distributed array 310 to be used by the instruction having the subscript reference 325. For example, in one embodiment, the execution environment 180 may perform send and receive message operations with another execution environment 180' to obtain distributed array 310 data not stored locally. Then, at step 445, the program flow and operations of the execution environment 180 continues in accordance with the instructions of the program 210.

If the subscript reference 325 is within the desired caching or shadowing range, the execution environment 180 and/or the array caching mechanism 315, at step 425, may check whether this is the first time that the subscript or subscript range of the subscript reference 325 has been referenced or whether the portion of the distributed array 310 identified by the subscript reference 325 has already been cached to the local array cache 320. If the portion of the distributed array 310 has not been previously cached, then, at step 435, the execution environment 180 obtains a copy of the referenced portion via the interface 220 from the other execution environment 180'-180'''. The obtained portion of the distributed array 310 is used by the referencing instruction, and the array caching mechanism 315 stores the obtained portion of the distributed array 310 to the local array cache 320, and, in one embodiment, updates the extension indices 330a-330b accordingly to reflect the cached portion 312. At step 445, the execution environment 180 continues with program or execution flow.

The next one or more times the subscript reference 325 is encountered loading an index of the distributed array 310 outside the local portion 311 but stored in the cached portion 312, the method at step 425 then can obtain the cached portion 312 at step 430 for use by the instruction of the program 210. This will prevent step 435 from being executed again reducing any performance loss and resource consumption due to obtaining the portion of the distributed array from another execution environment 180.

Although the caching operations of the techniques of the present invention are discussing during the execution of an instruction referencing an array 310 subscript outside the local portion 311, the caching operations illustrated by steps 435 and 440 of method 400 may be performed at any desired times as those ordinarily skilled in the art would appreciate. For example, in some embodiments, upon startup of the execution environment 180, invoking or loading of the program 210, or creation of the distributed array 310, an execution environment 180 and/or array caching mechanism 315 may obtain array 310 data from other execution environments 180-180''' and store the data locally in the cache 320 to form the desired cached portion 312 and corresponding extension indices 330a-330b.

Figure 4B:
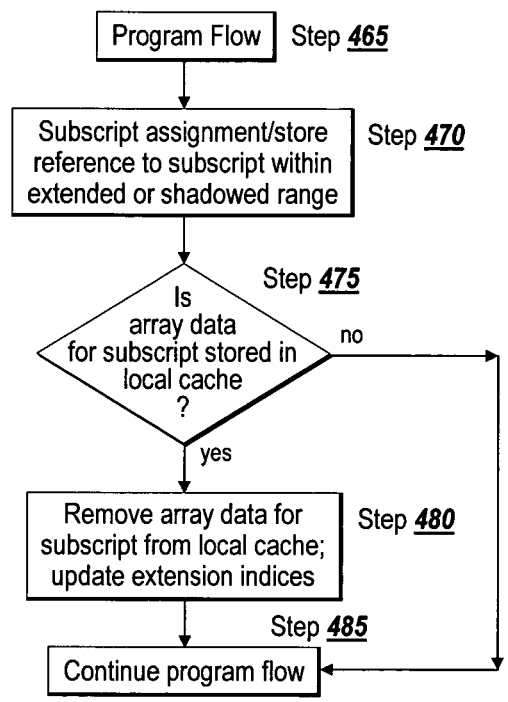
FIG. 4B is a flow diagram illustrating steps performed in practicing the de-caching techniques of an embodiment of the present invention.

In another aspect, the caching techniques of the present invention are directed to methods for de-caching, removing, or otherwise no longer providing the cached portion 312. In the flow diagram of FIG. 4B, method 460 depicts the de-caching operations of the one or more execution environments 180-180''' illustrated in FIGS. 3A and 3B. At step 465, an execution environment 180-180''' is executing a program flow of a program 210 invoked for execution. At some point during the program flow, the array caching mechanism 315 of an execution environment 180, at step 470, detects, recognizes, or interprets a reference to assign a value to an index or subscript of a portion of the distributed array 310 cached in the local array cache 320. For example, an interpreter of the execution environment 180 may interpret an instruction, such as the instruction comprising the subscript assign 327 of the program 210 of FIG. 3A, assigning a value to a subscript or subscript range of the distributed array 310.

At step 475, the execution environment 180 and/or the array caching mechanism 315 evaluates the distributed array subscript assign 327 to determine if the subscript of the distributed array 310 being assigned a value is within the desired caching or shadowing index range or stored in the local array cache 320. If the subscript assignment 327 is not being performed on a subscript of the distributed array 310 stored in the local array cache 320 or otherwise included in the cached portion 312, the execution environment 180 executes the instruction as desired and continues with the program flow at step 485 in accordance with the program 210.

If the subscript assignment 327 is being performed on a subscript of the distributed array 310 stored in the local array cache 320 or otherwise included in the cached portion 312, the execution environment 180 and/or array caching mechanism 320, at step 480, de-caches, deletes, or removes from the local array cache 320 at least the portion of the distributed array 310 having a value assigned to it and updates the extension indices 330a-330b accordingly. In some embodiment, the entire cached portion 312 is de-cached or removed, and the extension indices 330a-330b are set or reset to 0. In other embodiments, just the subscript or subscripts of the distributed array 310 being assigned a value are de-cached or removed, and the extension indices 330a-330b are updated to account for the indices of the cached portion 312 that are no longer cached.

In some embodiments of de-caching operations, the execution environment 180 and/or the array caching mechanism 320 does not remove or delete the portion of the distributed array 310 from the local array cache 320 but indicates by any suitable means and/or mechanism that the portion of the distributed array 310 stored in the local array cache 320 is no longer valid, current or otherwise should not be used. For example, any type and/or form of data structured may be used to track which portions of the distributed array 310 are currently stored in the local portion 311 and cached portion 312, and which elements of the cached portion 312 are currently valid, updated, or current. One ordinarily skilled in the art will recognize and appreciate that for de-caching operations, the elements of the cached portion 312 do not have to be permanently removed from the cache 320 but can be indicated as no longer cached.

Although illustrative methods 400 and 460 are generally described with regards to operations of a single execution environment 180, the same flow diagram may apply to multiple execution environments 180-180''' running the same program 210 so that illustrative methods 400 and 460 are performed on each execution environment 180-180''' in accordance with the respective local portion 311-311''', cached portions 312-312''' and corresponding extension indices 330a-330b'''. This can reduce the overall performance loss and resource consumption from multiple executing environments communicating or interfacing over a network to share data of a distributed array.

In view of the structure, function, and operations of the present invention, the illustrative caching and de-caching techniques provide an improvement to the performance of a SPDD or SPMD in a parallel technical computing environment. Using the techniques of the present invention, the frequency of interfacing, such as by message passing, required by operations using nearby or other portions of array data distributed to another environment may be reduced. For example, operations like finite difference methods, convolutions and image processing may frequently require access to adjacent or nearby distributed array data to perform the desired operations. By caching the frequently used portions of the distributed data, the present invention reduces the consumption of resources, such as network resources, and any latency related to the interface, such as network latency. Furthermore, the de-caching operations of the present invention provides a simpler approach for determining when cached data should no longer be used or needs to be updated. This avoids any further processing and complexities of coordinating and controlling the updating of cached portions across multiple execution environments.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for caching in a first computing environment one or more portions of a distributed array assigned for processing to a plurality of computing environments, the method comprising:
    providing an array to be distributed to the plurality of computing environments, the plurality of computing environments performing operations on a portion of the distributed array;
    assigning a first portion of the distributed array to the first computing environment, the first computing environment performing operations on and storing locally the first portion of the distributed array;
    processing, by the first computing environment, an operation that requires processing of a second portion of the distributed array, where:
        the second portion of the distributed array is assigned for processing to at least a second computing environment,
        the second portion of the distributed array is stored locally by the second computing environment, and
        the first computing environment and the second computing environment execute a same computer program;
    sending a request message by the first computing environment to the second computing environment requesting the second portion of the distributed array;
    obtaining, by the first computing environment in response to the request message, the second portion of the distributed array from the second computing environment; and
    storing locally the second portion of the distributed array along with the first portion of the distributed array.

2. The method of claim 1, further comprising:
    processing, by the first computing environment, a reference to the second portion of the distributed array when the second portion of the distributed array is obtained from the second computing environment; and
    providing, in response to the reference, the second portion of the distributed array from the storage associated with the first computing environment.

3. The method of claim 1, wherein the first portion comprises at least one of a first column or a first row of the distributed array, and the second portion comprises at least one of a second column, a second row, a third column, or a third row of the distributed array.

4. The method of claim 1, wherein the second portion further comprises a portion of the distributed array assigned for processing to a third computing environment.

5. The method of claim 1, wherein at least one of the first computing environment or the second computing environment executes on at least one of a first processor or a second processor.

6. The method of claim 1, further comprising:
    processing, by the first computing environment, an assignment of a value to an element of the second portion of the distributed array; and
    indicating, in response to the assignment, the second portion of the distributed array is not available from the storage associated with the first computing environment.

7. The method of claim 1, wherein the second portion comprises a portion of the distributed array nearby the first portion.

8. The method of claim 1, further comprising storing the second portion of the distributed array in the storage associated with the first computing environment only when a subscript range of the second portion comprises a predetermined subscript range of the distributed array.

9. The method of claim 8, wherein the predetermined subscript range is configurable via one of the first computing environment or the second computing environment.

10. The method of claim 1, wherein one of the first computing environment or the second computing environment comprises a technical computing environment.

11. A system for caching in a first computing environment one or more portions of a distributed array assigned for processing to a plurality of computing environments, the system comprising:
    a processor for providing an array to be distributed to the plurality of computing environments, the processor assigning a first portion of the distributed array to the first computing environment;
    the first computing environment performing operations on and storing locally the first portion of the distributed array, at least one of the operations requiring processing of a second portion of the distributed array, where:
        the second portion of the distributed array is assigned for processing to a second computing environment,
        the second portion of the distributed array is stored locally by the second computing environment;
    an array cache for providing storage for one or more portions of the distributed array for access by the first computing environment, the one or more portions of the distributed array stored in the array cache being identified by one or more extension indices that extend the first portion of the distributed array available to the first execution environment; and
    an array caching mechanism for storing a portion of the distributed array to the array cache;
    wherein, the array caching mechanism sends a request message to the second computing environment requesting the second portion of the distributed array, obtains the second portion of the distributed array from the second computing environment in response to the request message and stores locally the second portion of the distributed array along with the first portion of the distributed array in the array cache.

12. The system of claim 11, wherein in response to a reference in the first computing environment to the second portion of the distributed array when the second portion of the distributed array is obtained from the second computing environment, the second portion of the distributed array is provided from the array cache.

13. The system of claim 11, wherein the first portion comprises at least one of a first column or a first row of the distributed array, and the second portion comprises at least one of a second column, a second row, a third column, or a third row of the distributed array.

14. The system of claim 11, wherein the second portion further comprises a portion of the distributed array assigned for processing to a third computing environment.

15. The system of claim 11, wherein at least one of the first computing environment or the second computing environment executes on at least one of a first processor or a second processor.

16. The system of claim 11, wherein in response to assigning, in the first computing environment, a value to an element of the second portion of the distributed array, the array caching mechanism removes the second portion of the distributed array from the array cache.

17. The system of claim 11, wherein the second portion comprises a portion of the distributed array nearby the first portion.

18. The system of claim 11, wherein the array caching mechanism stores the one or more portions of the distributed array in the array cache only when a subscript range of the one or more portions represented by the one or more extension indices comprises a predetermined subscript range of the distributed array.

19. The system of claim 18, wherein the predetermined subscript range is configurable via one of the first computing environment or the second computing environment.

20. The system of claim 11, wherein one of the first computing environment or the second computing environment comprises a technical computing environment.

21. A device readable medium storing device readable instructions for caching in a first computing environment one or more portions of a distributed array assigned for processing to a plurality of computing environments, the medium storing one or more instructions for:
    providing an array to be distributed to the plurality of computing environments for the plurality of computing environments performing operations on a portion of the distributed array;
    assigning a first portion of the distributed array to the first computing environment, the first computing environment performing operations on and storing locally the first portion of the distributed array;
    processing, by the first computing environment, an operation that requires processing of a second portion of the distributed array, where:
        the second portion of the distributed array is assigned for processing to at least a second computing environment,
        the second portion of the distributed array is stored locally by the second computing environment, and
        the first computing environment and the second computing environment execute a same computer program;
    sending a request message by the first computing environment to the second computing environment requesting the second portion of the distributed array;
    obtaining, by the first computing environment in response to the request message, the second portion of the distributed array from the second computing environment; and
    storing locally the second portion of the distributed array along with the first portion of the distributed array.

22. The medium of claim 21, storing further instructions for:
    processing, by the first computing environment, a reference to the second portion of the distributed array when the second portion of the distributed array is obtained from the second computing environment; and
    providing, in response to the reference, the second portion of the distributed array from the storage associated with the first computing environment.

23. The medium of claim 21, wherein the first portion comprises at least one of a first column or a first row of the distributed array, and the second portion comprises at least one of a second column, a second row, a third column, or a third row of the distributed array.

24. The medium of claim 21, wherein the second portion further comprises a portion of the distributed array assigned for processing to a third computing environment.

25. The medium of claim 21, wherein at least one of the first computing environment or the second computing environment executes on at least one of a first processor or a second processor.

26. The medium of claim 21, further storing instructions for:
    processing, by the first computing environment, an assignment of a value to an element of the second portion of the distributed array; and
    indicating, in response to the assignment, the second portion of the distributed array is not available from the storage associated with the first computing environment.

27. The medium of claim 21, wherein the second portion comprises a portion of the distributed array nearby the first portion.

28. The medium of claim 21, further storing instructions for storing the second portion of the distributed array in the storage associated with the first computing environment only when a subscript range of the second portion comprises a predetermined subscript range of the distributed array.

29. The medium of claim 28, wherein the predetermined subscript range is configurable via one of the first computing environment or the second computing environment.

30. The medium of claim 21, wherein one of the first computing environment or the second computing environment comprises a technical computing environment.

* * * * *